United States Patent
Sulzbach et al.

(10) Patent No.: US 6,361,723 B1
(45) Date of Patent: Mar. 26, 2002

(54) PROCESS AND DEVICE FOR MANUFACTURING POLYURETHANE FOAM MOLDINGS

(75) Inventors: Hans-Michael Sulzbach, Königswinter; Jürgen Wirth, Köln, both of (DE)

(73) Assignee: Hennecke GmbH, Leverkusen (DE)

( * ) Notice: Subject to any disclaimer, the term of this patent is extended or adjusted under 35 U.S.C. 154(b) by 0 days.

(21) Appl. No.: 09/341,418

(22) PCT Filed: Jan. 7, 1998

(86) PCT No.: PCT/EP98/00032

§ 371 Date: Jul. 8, 1999

§ 102(e) Date: Jul. 8, 1999

(87) PCT Pub. No.: WO98/31522

PCT Pub. Date: Jul. 23, 1998

(30) Foreign Application Priority Data

Jan. 20, 1997 (DE) .......................................... 197 01 728

(51) Int. Cl.⁷ ............................................. B29C 44/02
(52) U.S. Cl. .......................... 264/51; 249/141; 264/102; 425/4 R
(58) Field of Search .................... 264/51, 102; 425/4 R; 249/141

(56) References Cited

U.S. PATENT DOCUMENTS

| | | | |
|---|---|---|---|
| 3,833,694 A | 9/1974 | Hughes | 264/51 |
| 3,970,732 A | 7/1976 | Slaats et al. | 264/40.5 |
| 4,285,893 A | 8/1981 | Contastin | 264/54 |
| 4,482,513 A * | 11/1984 | Auletti | 249/141 |
| 4,555,087 A | 11/1985 | Wallner et al. | 249/78 |
| 5,064,585 A * | 11/1991 | Cooper et al. | 264/102 |
| 5,356,580 A | 10/1994 | Clark et al. | 264/51 |
| 5,464,582 A | 11/1995 | Okano et al. | 264/45.5 |
| 5,482,721 A | 1/1996 | Clark et al. | 425/4 R |
| 5,536,458 A * | 7/1996 | Kawakita et al. | 264/102 |
| 5,587,183 A | 12/1996 | Clark et al. | 425/4 R |
| 5,589,202 A | 12/1996 | Okano et al. | 425/73 |
| 5,667,741 A * | 9/1997 | Tabata et al. | 425/4 R |
| 5,711,905 A * | 1/1998 | Behl | 264/102 |
| 5,851,457 A * | 12/1998 | Peterson et al. | 264/102 |
| 5,965,169 A * | 10/1999 | Hirata et al. | 425/4 R |

FOREIGN PATENT DOCUMENTS

| | | |
|---|---|---|
| DE | 1504278 | 9/1969 |
| DE | 2219609 | 10/1973 |
| DE | 2366184 | 6/1979 |
| DE | 3020793 | 12/1981 |
| EP | 0 044 226 | 1/1982 |
| EP | 0 023 749 | 7/1983 |
| GB | 2092509 | 8/1982 |

\* cited by examiner

*Primary Examiner*—Allan R. Kuhns
(74) *Attorney, Agent, or Firm*—Joseph C. Gil; Noland J. Cheung; Lyndanne M. Whalen

(57) ABSTRACT

A process and device are disclosed for manufacturing foam moldings. The parting plane of the mold has a circumferential vacuum channel, the top mold half has a suction channel for quickly evacuating the mold and self-closing expansion channels are arranged at the highest points of the inner cavity of the mold.

3 Claims, 3 Drawing Sheets

FIG. 2a A-A

PROCESS AND DEVICE FOR MANUFACTURING POLYURETHANE FOAM MOLDINGS

FIELD OF THE INVENTION

The present invention relates to a process and a device for the production of shaped foamed polyurethane articles by introducing an expandable polyurethane reactive mixture into a mould divided by a parting plane, wherein the parting plane has a circumferential vacuum channel through which the mould cavity defined by the mould halves is evacuated. There have already been a number of proposals for this; see e.g. DE-A 15 04 278, DE-A 30 20 793 and EP-A 23 749.

BACKGROUND OF THE INVENTION

Evacuation of the mould is necessary in particular in order to remove the gas present in the mould from the mould to avoid the formation of voids. To achieve this, it is necessary to construct the mould halves such that the parting plane lies at the highest point of the mould cavity, since otherwise a pocket forms from which the gas present can no longer can be drawn off. This could be counteracted by evacuating the mould cavity to a very low pressure of below 100 mbar, in particular below 50 mbar, before the foam rises, i.e. before the level of the foam in the mould cavity passes beyond the parting plane. However, such a low pressure in the mould cavity means that the foam initially expands so rapidly and severely, before substantial contents of blowing agent have yet been released, that only an irregular foam structure forms.

Another disadvantage of evacuation via the parting plane is that the delivery via the parting plane is relatively low, especially if the expandable reactive mixture is introduced into the open mould and evacuation is carried out only after the mould has been closed, so that very long cycle times are necessary.

The properties of polyurethane foam are substantially determined by the bulk density of the finished foam and the material properties of the matrix. If water is employed as a chemical blowing agent in particular, in which case carbon dioxide is liberated by the reaction of the water with the isocyanate, the recipe of the expandable polyurethane reactive mixture must be adjusted precisely to establish the matrix properties. It is therefore in principle desirable to be able to produce foams of different bulk densities with a single recipe. Controlling the pressure in the foam mould is outstandingly suitable for controlling the bulk density of a foam while simultaneously retaining the recipe, especially of the blowing agent content, see e.g. EP-A 23 749 and EP-A 44 226.

SUMMARY OF THE INVENTION

The object of the present invention is to produce, over short cycle or sequence times, void-free mouldings of lower bulk density than is to be expected on the basis of the blowing agent content under atmospheric pressure, it also being possible to employ contoured mould cavities in which the parting plane cannot be placed at the points of maximum height of the mould cavity for geometric reasons.

BRIEF DESCRIPTION OF THE DRAWINGS

FIG. 2a shows the preferred embodiment of the expansion channels of FIG. 2 along line A—A.

DETAILED DESCRIPTION OF THE INVENTION

Figure 1:
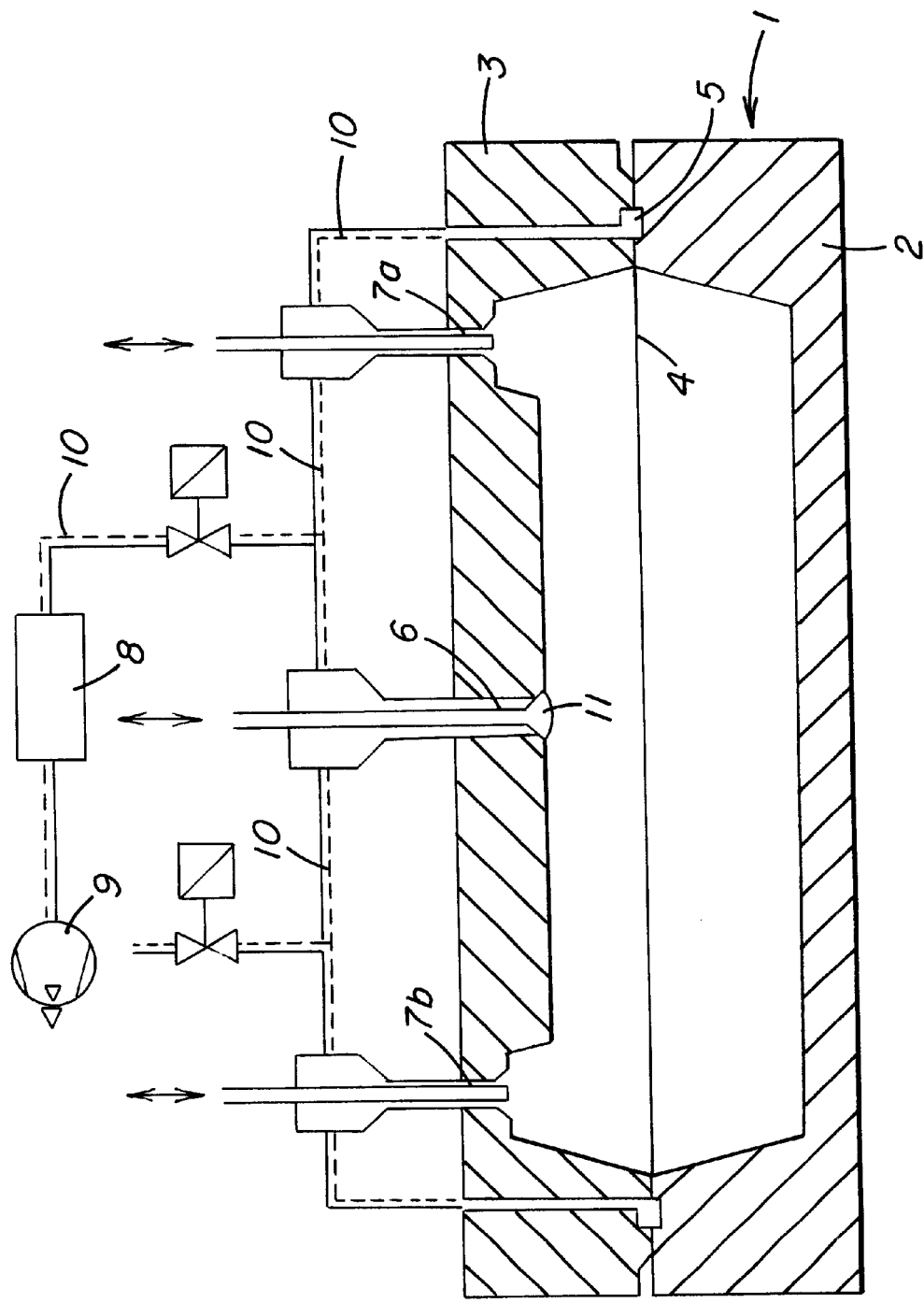
FIG. 1 shows a device according to the invention.

According to the invention, this is achieved in that the upper mould half has a closable suction opening through which the internal pressure in the mould is evacuated rapidly, preferably within the cream time of the expanding polyurethane reactive mixture, to 300 to 800 mbar absolute, in that the suction opening is closed when the given internal pressure in the mould is reached, wherein the expandable mixture expands to fill the mould cavity, expansion channels with such a low cross-section that they are closed by penetration of the expanding mixture are provided at the point or points of maximum height of the mould cavity, and the parting plane has a vacuum seal to avoid penetration of gas, the suction opening, the vacuum channels and the expansion channels being connected to the same vacuum source.

The mould cavity is preferably evacuated to 400 to 700 mbar absolute.

The increase in pressure after the foam has risen, i.e. substantially after all the blowing agent has been released, takes place due to an increase in temperature because of the heat of reaction and optionally small further amounts of blowing agent released. It should preferably take place to a pressure of 700 to 1,100 mbar absolute, particularly preferably 700 to 900 mbar.

According to the invention, the expandable polyurethane reactive mixture can be introduced into the open mould without disadvantage to the cycle time, since the desired minimum internal pressure in the mould to which the expanding foam can be exposed without disadvantage is achieved within the shortest time through the suction opening provided according to the invention.

The present invention also provides a device for the production of shaped foamed polyurethane articles which has a mould cavity defined by an upper and lower mould half, which can be separated by a parting plane, and means for introducing an expandable polyurethane reactive mixture into the lower mould half, wherein the parting plane has a vacuum seal, the upper mould half has a closable suction opening and the points of maximum height of the upper mould half have expansion channels, the cross-section of which is such that they can be closed by penetration of reactive mixture which has not yet cured, and a common vacuum source and connecting lines from the vacuum source to the vacuum seal, suction opening and expansion channels.

The vacuum source is preferably constructed in the form of a vacuum tank several times the volume of the mould cavity, the vacuum tank being connected to a vacuum pump.

The expansion channels can have a circular or slit-like cross-section. The lower cross-section dimension of the expansion channels is preferably 0.1 to 0.5 mm, particularly preferably 0.1 to 0.3 mm.

The expansion channels are particularly preferably equipped with an ejection ram, for example needle-shaped, for the polyurethane which has penetrated. The expansion channels are furthermore preferably formed by gaps between an ejection ram of larger dimensions and its bore through the upper mould half.

The invention is described in more detail below with the aid of the attached figures. FIG. 1 shows a device according to the invention.

FIG. 1 shows a mould 1 which comprises a lower mould half 2 and an upper mould half 3, wherein the mould halves are separated by the parting plane 4. A circumferential channel 5 is provided as a vacuum seal in the parting plane. The upper mould half furthermore has a suction opening 6 which can be closed, for example, by the closing cone 11 when the desired internal pressure in the mould is reached. Expansion channels 7a and 7b are furthermore provided at the points of maximum height of the interior of the mould. The vacuum seal 5, suction opening 6 and expansion channels 7a and 7b are connected via corresponding lines 10 to the vacuum tank 8, shown in reduced size in the diagram, from which gas is sucked via the vacuum pump 9.

Figure 2:
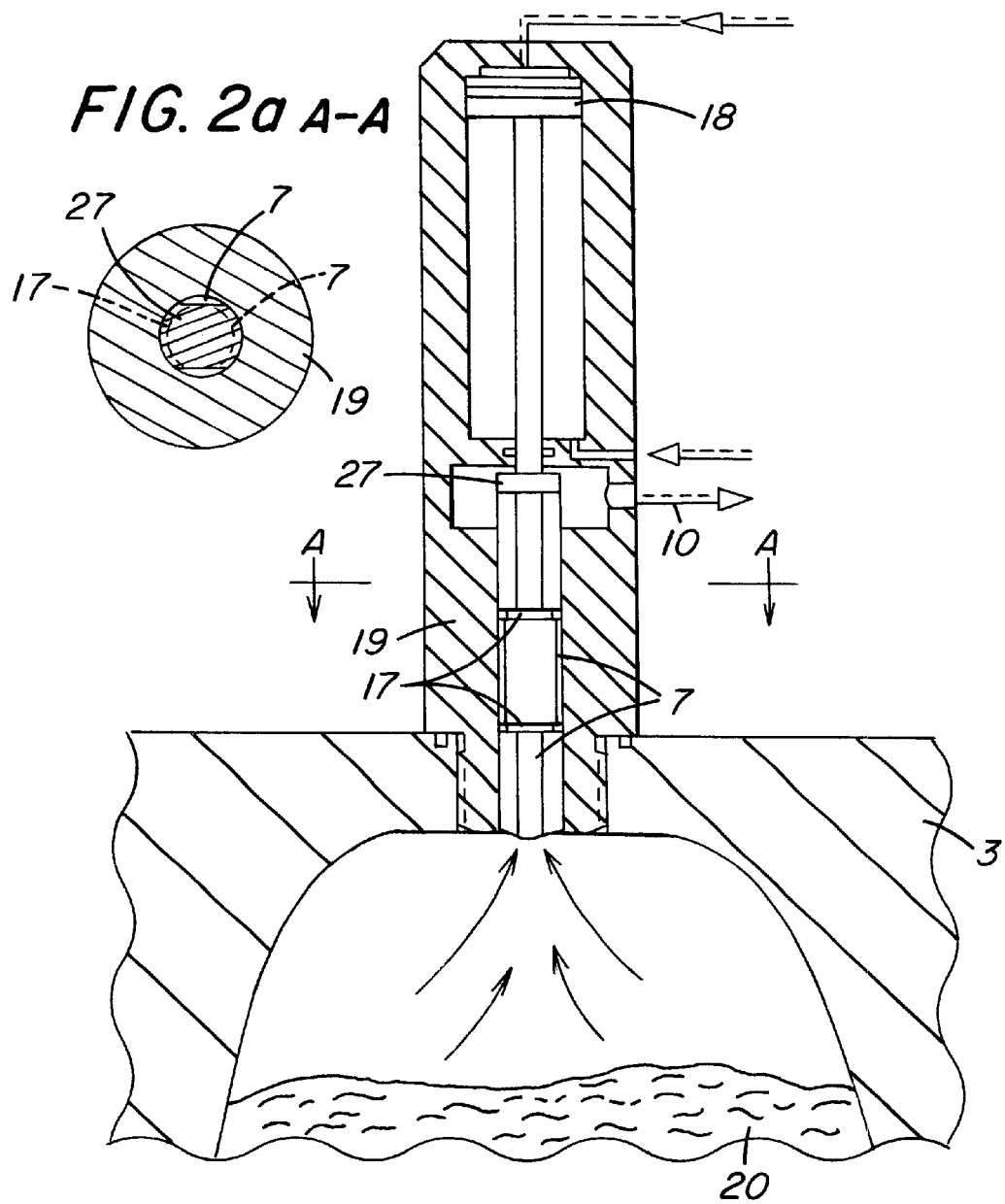
FIG. 2 shows the preferred embodiment of the expansion channels.

FIG. 2 shows in section the section of an upper mould half 3 with the maximum height of the interior of the mould. The expansion channel 7 is constructed in the form of flattened areas of the ram 27 which can be ejected by means of a hydraulic device 18. The expansion channel here is staggered in sections over the circumference of the ejection ram 27, the staggered expansion channel sections being connected to one another via a circumferential groove 17. During rising of the foam 20, gas is further drawn off from the interior of the mould through the expansion channels and via the connecting line 10 to the vacuum source, so that the low internal pressure in the mould is maintained. When the expanding foam reaches the expansion channels 7, it penetrates into these, closing these at the same time. After the foamed moulding is removed from the mould, the ejection ram 27 is moved out of the casing 19 by means of the hydraulics 18 so that the polyurethane which has penetrated into the expansion channels 7 can be removed.

Figure 3:
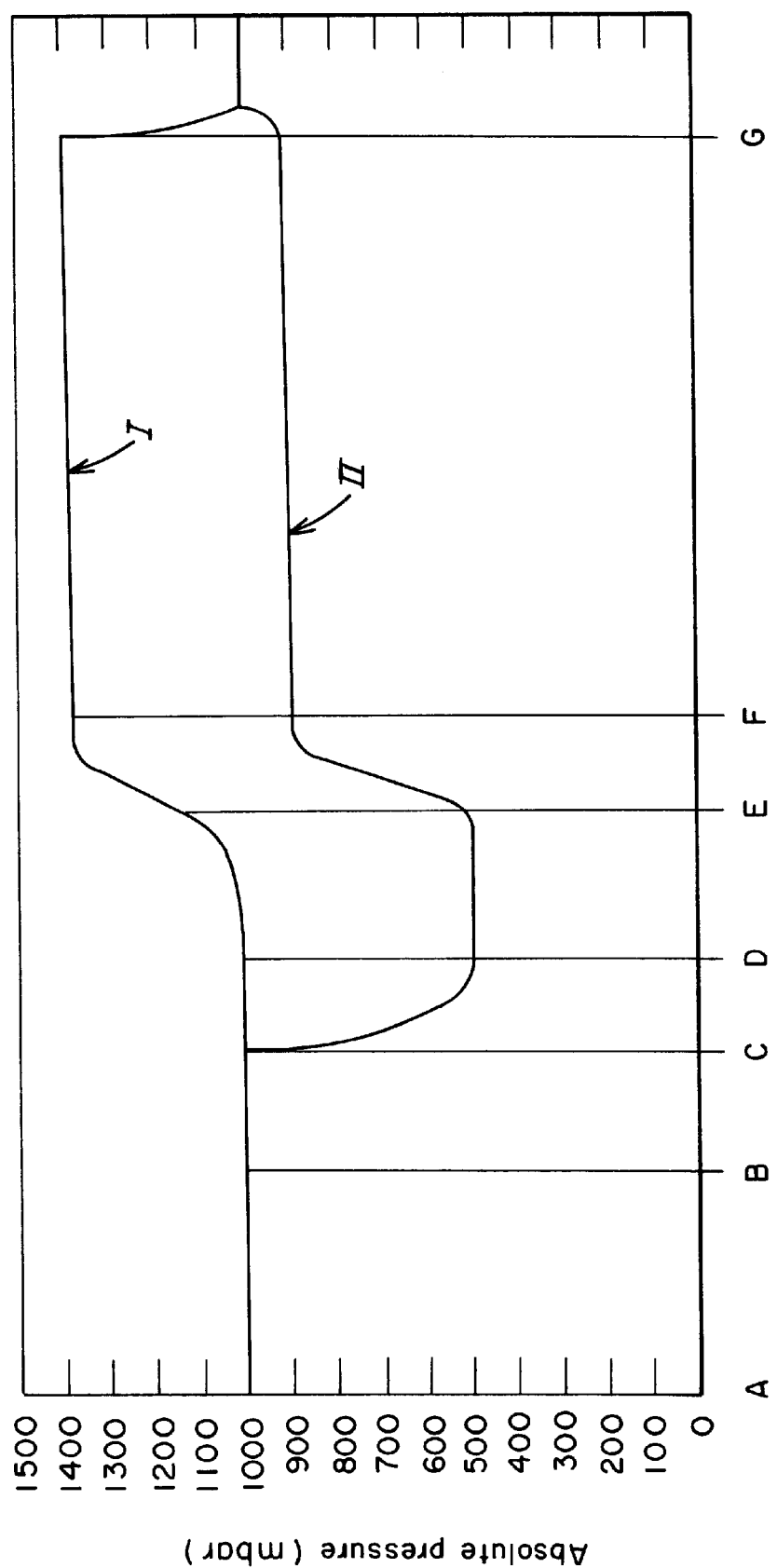
FIG. 3 shows the pressure course with respect to time, according to the invention, in the mold.

FIG. 3 shows by way of example the course of the pressure within the mould in a conventional process (I) and a process according to the invention (II) for foam moulding production.

The pressure passes through the following phases here:

A: Start of the introduction of the expandable polyurethane reactive mixture into the open mould.

B: Introduction has ended; start of the cream time; closing of the mould.

C: Mould is closed, rapid drop in pressure due to evacuation via the suction opening (according to the invention)

D: The desired internal pressure in the mould of 500 mbar absolute here is reached; transition from the cream time to the rising time.

E: The foam fills the mould; end of the rising time; start of the holding pressure time. In the conventional foam moulding process (I), a noticeable increase in pressure is already to be detected within the mould because of the resistance of the displaced gas due to the rising foam.

F: The maximum internal pressure of the mould, which corresponds to the maximum internal pressure of the foam cells, is reached.

G: Opening of the mould and removal of the moulding.

What is claimed is:

1. A process for the production of shaped foamed polyurethane articles by introducing an expandable polyurethane reactive mixture into the lower mould half of a mould divided by a parting plane and evacuation of the mould, the parting plane having a vacuum seal, characterized in that the mould cavity is evacuated rapidly through a closable suction opening provided in the upper mould half to a pressure of 300 to 700 mbar absolute, the evacuation pressure which is a function of the recipe of the expandable polyurethane reactive mixture is such that the final internal pressure in the mould is 800 to 1,100 mbar, the suction opening is closed, the reaction mixture expanding to fill the mould cavity and the expanding mixture penetrating into expansion channels which are provided at the point or points of maximum height of the mould cavity and have a low cross-section so that said expansion channels close, the vacuum seal, suction opening and expansion channels being connected to the same vacuum source.

2. A device for the production of shaped foamed polyurethane articles comprising a mold cavity defined by an upper mold half and a lower mold half which cavity can be separated by a parting plane and the parting plane having a vacuum seal, and means for introducing an expandable reactive mixture into the lower mold half, which is characterized in that the upper mold half has a closable suction opening and, at the points of maximum height of the interior of the mold, has expansion channels which are formed by gaps between an ejection ram passing through the upper mold half and its bore, the cross-section of these channels is such that they can be closed by penetration of reactive mixture which has not yet cured, and a vacuum source and connecting lines from the vacuum source to the vacuum seal, suction opening and the expansion channels.

3. The device of claim 2 in which the vacuum source is constructed in the form of a vacuum tank several times the volume of the mold cavity, and the vacuum source is connected to a vacuum pump.

\* \* \* \* \*